United States Patent [19]
Lambert

[11] 3,975,284
[45] Aug. 17, 1976

[54] PROCESS FOR THE MANUFACTURE OF SOLUTIONS OF HALOGENS

[75] Inventor: Marc Lambert, Paris, France

[73] Assignee: Compagnie Industrielle de Filtration et d'Equipement Chimique, France

[22] Filed: Dec. 2, 1974

[21] Appl. No.: 528,769

Related U.S. Application Data

[63] Continuation of Ser. No. 279,038, Aug. 9, 1972, abandoned.

[52] U.S. Cl. .............................. 252/187 R; 210/62; 423/503
[51] Int. Cl.² ........................................... C09K 3/00
[58] Field of Search ............. 423/500, 503; 210/62; 252/187 R

[56] References Cited
UNITED STATES PATENTS

| | | | |
|---|---|---|---|
| 1,142,361 | 8/1915 | Ornstein | 210/62 |
| 1,949,934 | 3/1934 | Fulton | 210/62 |
| 1,962,571 | 6/1934 | Ornstein | 210/62 UX |
| 2,382,734 | 8/1945 | Marks | 210/62 |
| 2,541,799 | 2/1951 | White | 210/62 X |
| 3,401,116 | 9/1968 | Stanwood | 210/62 |

*Primary Examiner*—Leland A. Sebastian
*Attorney, Agent, or Firm*—William A. Drucker

[57] ABSTRACT

Installation for the production of chlorine or chlorine dioxide water or of solutions of a mixture of halogen and halogen derivatives, characterized by a closed circuit under pressure in which circulates water to be enriched, with an over-pressure produced by a pump, the basic chemical element being permanently injected into this circuit by means of a water-ejector, the discharge of the terminal solution, which leaves the reactor under pressure, being compensated by a supply of water to the closed circuit.

Application to the treatment of water for drinking, for industrial use and for swimming pools.

1 Claim, 3 Drawing Figures

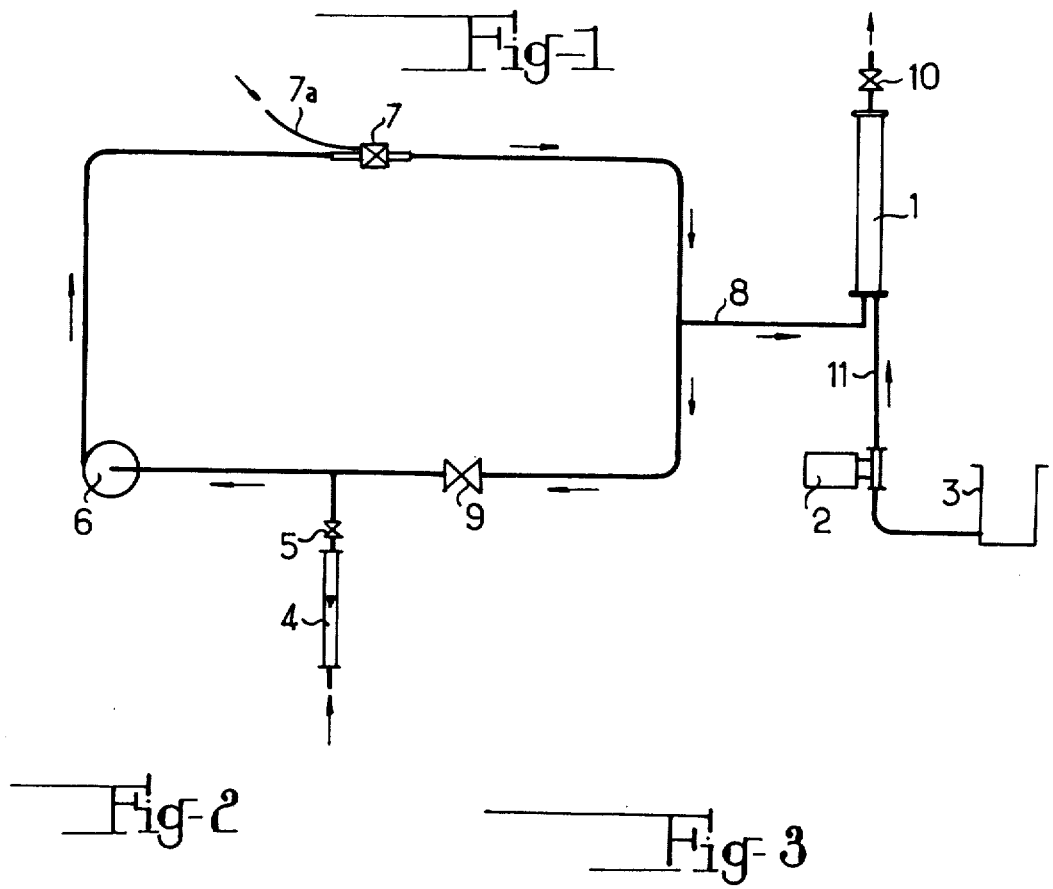
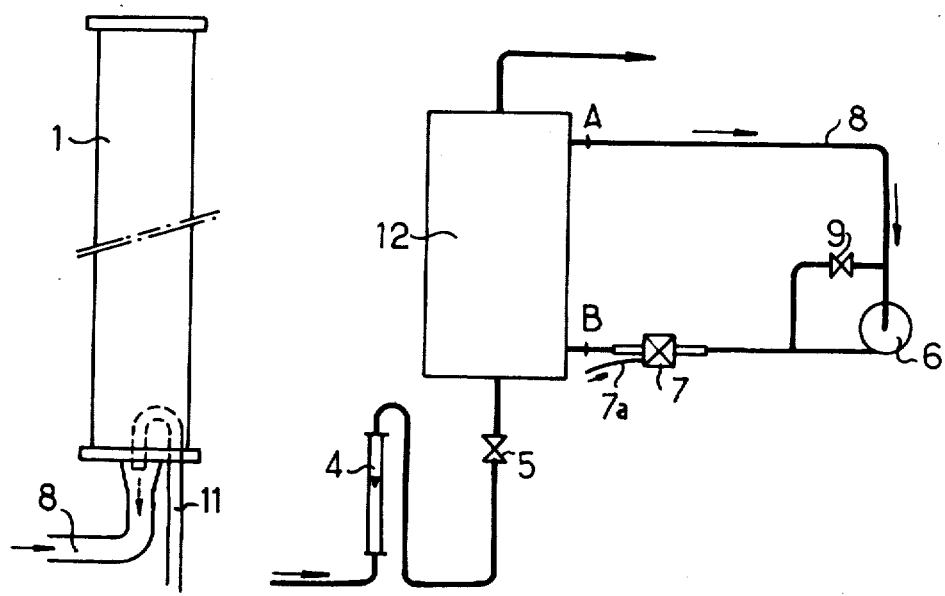

PROCESS FOR THE MANUFACTURE OF SOLUTIONS OF HALOGENS

This is a continuation of application Ser. No. 279,038, filed Aug. 9, 1972, now abandoned.

The present invention relates to the manufacture of pure or mixed solutions of halogens and of their derivatives intended more particularly for the treatment of water for drinking, industrial and swimming pool use.

Their oxidizing, bactericidal, algicidal and deodorizing power is well known, particularly in the treatment of drinking water, swimming pools, waste water, industrial water, process water, cooling water, etc.

The apparatus at present available is mostly specifically for the manufacture or distribution of a particular product (apparatus for the distribution and titration of bromine, of chlorine, of chlorine dioxide, of chloramines, etc.). Generally, in the particular cases of chlorine dioxide and chlorine water, the installation comprises several stages completely separate or gravity fed from one to the next, and hence one or more recirculations by pump or venturi.

The object of the invention is a process which enables an easily measurable oxydising and bactericidal solution to be obtained under pressure in a continuous manner.

This process consists essentially in causing water for enriching to be circulated continuously and under pressure in a closed circuit, while permanently injecting a halogen or one of its derivatives into the circuit and drawing off, at a point of the circuit, a certain proportion of the high-grade water which circulates there, at the same time compensating for the discharge by a supply of water.

The solution thus enriched, being discharged under pressure, can be injected directly into a reactor.

Another object of the invention is an apparatus for manufacturing several oxydizing products which are used in the process envisaged.

The various details, as also the advantages of the invention, will be seen clearly with the aid of the description which follows.

On the annexed drawing:

FIG. 1 is a diagram of a preferred mode of execution of an installation conforming to the invention;

FIG. 2 illustrates the reactor which such an installation calls for; and

FIG. 3 represents a variation of the enriching circuit which forms part of the installation.

In FIG. 1 it can be seen that the installation comprises firstly a reactor 1, secondly means (2,3) to inject a reactive solution into this reactor, and finally a circuit to feed the reactor with halogen water.

This last circuit is the principal object of the invention and may be used independently to produce concentrated solutions, particularly of chlorine.

It comprises: means of introducing under pressure a controlled and adjustable supply of water — rotameter 4 and regulating valve 5 —, a compression pump 6; a water-ejector or venturi 7; a discharge conduit 8 and a valve 9.

The process of enrichment which this circuit provides, using for example chlorine, consists essentially in causing the water for enrichment to be circulated continuously under pressure in the closed circuit, while permanently injecting chlorine into the circuit and drawing off a certain proportion of the clorinated water which is circulating, at the same time compensating for the quantity drawn off by an injection of water (or of weaker chlorinated water).

The chlorine injection is made at 7a by suction of chlorine, preferably in the gaseous state.

It would equally be possible to introduce the chlorine in solution, either as chlorinated water (several of the type described being used in succession), or in the form of a solution of hypochlorite or other compounds.

It should however be emphasized that the introduction of the chlorine in the gaseous state permits the quantity of water in circulation to be kept constant, which facilitates the enrichment. This last is also facilitated by the fact that the whole of the water to be enriched, already rich in chlorine, passes through the venturi.

The supply of chlorinated water is regulated by means of an output valve 10, and the components 4 and 5 allow exact compensation to be effected by the supply of fresh water. The quantity of chlorinated water circulating in the closed circuit remains constant. The pump 6 causes mixing which facilitates the enrichment, further it compensates for the loss of pressure in the circuit; hence the chlorinated water leaves the installation under pressure. This constitutes an important advantage of the invention, since this chlorinated water is particularly suited for feeding directly under pressure and without a supplementary pump or venturi, into the reactor 1 for the manufacture of chlorine dioxide, as will be explained later.

Another advantage of the apparatus described is that it permits the manufacture of chlorinated water which is very rich in chlorine, with a chlorine concentration and an output which can be varied between large limits at any time by the simple adjustment of a valve.

The amount of chlorinated water drawn off is generally much less than the amount in circulation, for example from 2 to 20 times less.

In the application of the invention illustrated by FIG. 1, the chlorinated water at a high concentration injected at 8 and the sodium chlorite solution injected by means of the adjustable titration pump 2 from the storage tank 3, react in the reactor 1 according to the known formula:

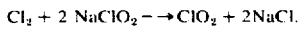

$$Cl_2 + 2\ NaClO_2 \rightarrow ClO_2 + 2NaCl.$$

Hence a highly concentrated solution of chlorine dioxide under pressure is produced at the output of the reactor.

Such a solution has unquestionable oxydizing, sterilizing, deodorizing and cleaning powers.

Since the solution is obtained under pressure at the output of the reactor, the necessity is avoided of further pumping of this noxious product or of exposing it to the atmosphere, which would be harmful to its stability. The solutions used are screened from light and isolated from the atmosphere, which removes all risk of combustion. Further, because of the suppression of high points, gas pockets cannot be formed, hence the risk of explosion is eliminated.

This method also allows the injection of oxydizing solution into the discharge from exhaust pumps.

The reactor 1 (FIG. 2) is arranged to ensure continuous mixing with the greatest possible contact surface between the chlorinated water and the chlorite and perfect homogenization of the chlorine dioxide solution.

Another application, non-limitative, of the material described, consists of injecting into the reactor 1 a bromide solution. It is a known fact that a chlorine-bromine mixture (the quantity of bromine being for example from 5 to 10% of the quantity of chlorine), has a bactericidal power which is greatly superior to the individual or successive action of one or the other of these two elements.

Another application is in algicidal treatment by the chlorine-copper system. By means of the invention described, a concentrated solution of chlorine, which until now could not be obtained continuously and under pressure, can be passed into a reactor 1 containing copper turnings.

The working principle of the installation described permits sample and instantaneous electric control, which may be for example a chronometer-controlled system for sudden or intermittent treatment.

Another example of an application is in the manufacture of chloramines by the injection of ammonia or of ammoniacal salts into the reactor 1.

It may be of interest to place porous or perforated trays, made of material unaffected by chlorine products, inside the reactor. The reactor could also be packed with rachis rings or with pieces of porcelain, lava, carbon, coke, etc..

Another artifice which improves the mixing consists of introducing the chlorite against the flow by means of a bent conduit 11 (FIG. 2) whose extremity penetrates into the entry conduit 8 for the chlorinated water.

It must be well understood that various modifications could be made to the installation described and illustrated, without departing from the spirit of the invention.

Thus, a variation in the enriching circuit is shown in FIG. 3. In this variation, this circuit includes a reservoir 12 which allows its capacity to be augmented. The fresh water is introduced under pressure through the components 4-5, at the base of the reservoir, the drawing off being effected at the top (conduit 8). The circulation is effected through the reservoir between two points A and B, by means of a pump 6 and through a water-ejector 7; the operation is the same as in FIG. 1. The valve 9 is placed in parallel across the pump, which gives more flexibility to the operation of the water-ejector.

The water-ejector could equally well be placed in the region of the point A, the pump being then directly joined to the point B, and the direction of circulation being reversed.

I claim:

1. Process for the manufacture of highly concentrated solutions of at least one halogen in water, comprising continuously recirculating said solution by pressure applied thereto along a closed loop trajectory in a constant circular direction, continuously injecting into said recirculated solution at a first point of said trajectory in the direction of circulation, a weaker solution, the halogen concentration of which may have a nil value, continuously injecting halogen into said circuit, at a second point of said trajectory, different from said first point, in the direction of circulation, continuously drawing off at a third point of said trajectory, distinct from said first and second points a controllably variable liquid volume which is a fraction only of said highly concentrated solution, which fraction may have a nil value, while continuously to recirculate under said pressure the remaining solution in the circuit, and automatically feeding at said first point a volume of said weaker solution equal to the volume of said drawn off fraction, said pressure applied to the solution being independent of the pressure of the weaker solution and halogen injected at said first and second points.

* * * * *